United States Patent [19]

Holub

[11] Patent Number: 4,908,418

[45] Date of Patent: Mar. 13, 1990

[54] TERNARY POLYMER BLENDS

[75] Inventor: Fred F. Holub, Schenectady, N.Y.

[73] Assignee: General Electric Company, Pittsfield, Mass.

[21] Appl. No.: 344,007

[22] Filed: Jan. 29, 1982

[51] Int. Cl.⁴ .................. C08L 67/02; C08L 69/00; C08L 79/08

[52] U.S. Cl. .................. 525/425; 525/433; 524/537; 524/538

[58] Field of Search ................ 525/425, 433

[56] References Cited

U.S. PATENT DOCUMENTS

| | | | |
|---|---|---|---|
| 4,052,481 | 10/1977 | Asahara | 525/425 |
| 4,141,927 | 2/1979 | White | 525/423 |
| 4,171,330 | 10/1979 | Kyo | 525/425 |
| 4,250,219 | 2/1981 | Robeson | 525/425 |
| 4,309,518 | 11/1982 | Holbeck | 525/425 |

FOREIGN PATENT DOCUMENTS 8000349  3/1980  PCT Int'l Appl. .............. 525/425

Primary Examiner—Patricia Short
Attorney, Agent, or Firm—Bernard, Rothwell & Brown

[57] ABSTRACT

Disclosed are ternary blends of (a) a polyetherimide and (b) a polyarylate, an aromatic polyester which is derived from a dihydric phenol and a dicarboxylic acid and (c) a thermoplastic polymer selected from polycarbonates and aliphatic-aromatic polyesters which is compatible with the polyetherimide and the polyarylate. The blends exhibit a high heat distortion temperature and have a good degree of flame resistance.

14 Claims, No Drawings

TERNARY POLYMER BLENDS

This invention relates to a class of ternary blends of a polyetherimide, a polyarylate, and a thermoplastic polymer selected from polycarbonates and aliphatic-aromatic polyesters which is compatible with the blend of polyetherimide and polyarylate. The blends exhibit a high heat distortion temperature, frequently in excess of 300° F., and have a good degree of flame resistance.

The ternary blends of the invention include a polyetherimide such as that of the formula:

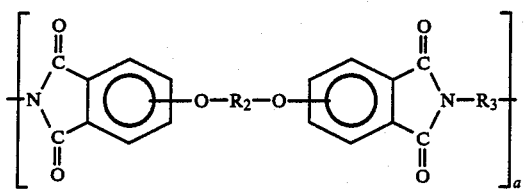

where a represents a whole number in excess of 1, e.g., 10 to 10,000 or more, the divalent bonds of the —O—$R_2$—O— radical being situated on the phthalic anhydride end groups, e.g., in the 3,3', 3,4', 4,3' or the 4,4' positions and $R_2$ is selected from (a) substituted or unsubstituted aromatic radicals such as

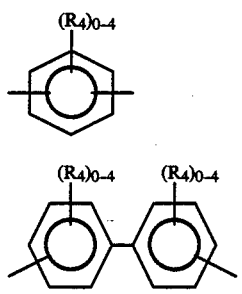

and (b) divalent organic radicals of the general formula:

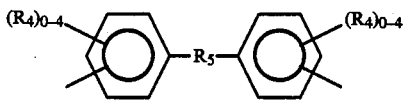

where $R_4$ is independently alkyl of one to six carbon atoms or halogen and $R_5$ is a member selected from the class consisting of divalent radicals of the formulas,

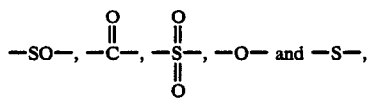

alkylene of one to six carbon atoms, cycloalkylene of four to eight carbon atoms, and alkylidene of one to six carbon atoms or cycloalkylidene of four to eight carbon atoms; and $R_3$ is a divalent organic radical selected from the class consisting of aromatic hydrocarbon radicals having from 6 to 20 carbon atoms and halogenated derivatives thereof or alkyl substituted derivatives thereof where the alkyl group contains from one to six carbon atoms, alkylene radicals and cycloalkylene radicals having from 2-20 carbon atoms, $C_{(2-8)}$ alkylene terminated polydiorganosiloxane, and divalent radicals included by the formula

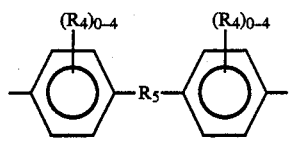

where $R_4$ and $R_5$ are as set forth above and where $R_5$ may be a direct bond.

Other polyetherimides suitable for the purposes of the present invention include the substituted polyetherimides of the formula:

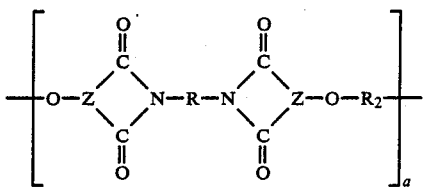

wherein

is a member selected from

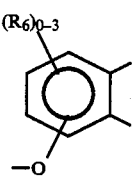

wherein $R_6$ is independently hydrogen, lower alkyl or lower alkoxy

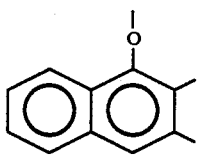

and

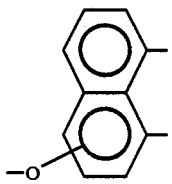

wherein the oxygen may be attached to either ring and located ortho or para to one of the bonds of the imide carbonyl groups, $R_2$ and $R_3$ and a are as previously defined.

Preferred polyetherimides for the purposes of the invention are those of the formula

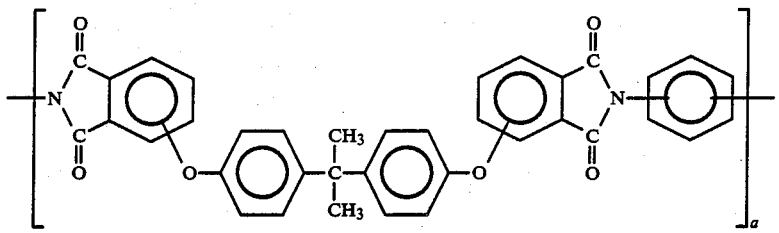

such as the polyetherimide which is the reaction product of essentially equimolar amounts of metaphenylene diamine and 2,2-bis[4-(3,4-dicarboxyphenoxy)phenyl propane.

The polyetherimide-polyarylate blends of the invention also include a polyarylate (an aromatic polyester) which is derived from one or more dihydric phenols (sometimes referred to as bisphenols or diphenols or derivatives thereof and one or more aromatic polycarboxylic acids or derivatives thereof such as acid anhydrides, acid esters or acid halides.

Suitable dihydric phenols for producing the polyarylates include those having the general formula:

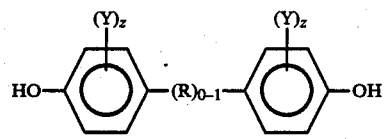

wherein Y is independently selected from alkyl groups of 1 to 6 carbon atoms, cycloalkyl groups of 6 to 12 carbon atoms, aryl groups of 6 to 20 carbon atoms, chlorine or bromine, z has a value of from 0 to 4, inclusive, and R is a divalent saturated aliphatic or aromatic hydrocarbon radical, particularly alkylene and alkylidene radicals having from 1 to 8 carbon atoms, cycloalkylene and cycloalkylidene radicals having up to and including 9 carbon atoms, and arylene radicals having from 6 to 20 carbon atoms and derivatives of such dihydric phenols.

Examples of alkylene groups for R which contain 1 to 5 carbon atoms include a methylene group, an ethylene group, a propylene group, a tetramethylene group, and the like. Examples of alkylidene groups for R which contain from 1 to 8 carbon atoms include an ethylidene group, a propylidene group, an isopropylidene group, and isobutylidene group, and the like. Examples of alkyl groups for Y containing 1 to 6 carbon atoms include a methyl group, an ethyl group, an isopropyl group, a tert-butyl group, and the like. Preferred dihydric phenols are those where z is 0 and R is an alkylidene radical of three carbon atoms.

Specific examples of dihydric phenols for forming polyarylates are 4,4'-dihydroxydiphenyl ether, bis(4-hydroxy-2-methylphenyl) ether, bis(4-hydroxy-3-chlorophenyl) ether, bis(4-hydroxyphenyl) sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4-hydroxyphenyl)ethane, 2,2-bis(4-hydroxyphenyl)propane, 2,2-bis(4-hydroxy-3-methylphenyl) propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. The diphenol 2,2-bis(4-hydroxyphenyl)propane (also known as bisphenol A) is readily available and is a preferred diphenol.

Typical examples of functional derivatives of the dihydric phenols which can be used to produce polyarylates are the alkali metal salts and diesters thereof with aliphatic monocarboxylic acids containing 1 to 3 carbon atoms. Suitable examples of aliphatic monocarboxylic acids include formic acid, acetic acid, propionic acid, and the like. Preferred functional derivatives of the dihydric phenols are the sodium salts, the potassium salts, and the diacetate thereof.

The aromatic polycarboxylic acids for producing polyarylates include dicarboxylic acids of the general formula:

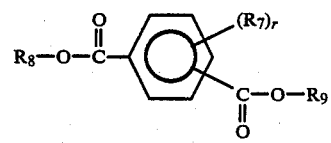

where $R_7$ is hydrogen, alkyl of one to ten carbon atoms or a halogen atom and r is 0 or an integer from 1 to 4 and $R_8$ and $R_9$ are hydrogen. Common examples of dicarboxylic acids of the above formula include tetrachlorophthalic, isophthalic, terephthalic and orthophthalic acids. Other suitable aromatic dicarboxylic acids include diphenic acid, naphthalene dicarboxylic acid and derivatives thereof.

Examples of functional derivatives of polycarboxylic acids which can be used, i.e., $R_8$ and $R_9$ are other than hydrogen, include acid halides, dialkyl esters and diaryl esters. Specific examples of phthalic acid halides include terephthaloyl dichloride, isophthaloyl dichloride, terephthaloyl dibromide and isophthaloyl dibromide. Examples of dialkyl esters include dialkyl esters of these acids containing 1 to 6 (preferably 1 to 2) carbon atoms in each alkyl moiety thereof. Preferred examples of diaryl esters of phthalic acids include diphenyl terephthalate, and diphenyl isophthalate.

A presently preferred polycarboxylic acid for producing polyarylates is a mixture of about 90 to about 10 mol % of terephthalic acid and/or its functional derivatives and about 10 to about 90 mol % of isophthalic acid and/or functional derivatives. More preferably, a mixture of 40 to 80 mol % of terephthalic acid and/or its functional derivatives and 60 to 20 mol % of isophthalic acid and/or its functional derivatives is used. Polyarylates prepared from a diphenol as described above and a mixture of 50 to 70 mol % of terephthalic acid and/or its functional derivatives and 30 to 50 mol % of isophthalic acid and/or its functional derivatives are most preferred. The molar ratio of the diphenol(s) to the sum of the terephthalic acid units and isophthalic acid units is substantially equimolar, e.g., about 1:1.

As mentioned previously, the third blend component of the ternary blends of the present invention is a thermoplastic polymer selected from polycarbonates and aliphatic-aromatic polyesters. Polycarbonates for use in the invention can be generally defined as high molecular weight, thermoplastic, aromatic polymers and include homopolycarbonates and copolycarbonates and mixtures thereof which have average molecular weights of about 8,000 to more than 200,000, preferably of about 20,000 to 80,000 and an I.V. of 0.40 to 1.0 dl/g as measured in methylene chloride at 25° C. These polycarbonates are derived from dihydric phenols such as, for example, 2,2-bis(4-hydroxyphenyl)propane, bis(4-hydroxyphenyl)methane (also known as bisphenol A), 2,2-bis(4-hydroxy-3-methylphenyl)propane, 4,4-bis(4-hydroxyphenyl)heptane, 2,2-(3,5,3′,5′-tetrachloro-4,4′-dihydroxyphenyl)propane, 2,2-(3,5,3′,5′-tetrabromo-4,4′-dihydroxydiphenyl)propane, and (3,3′-dichloro-4,4′-dihydroxydiphenyl)methane. Other dihydric phenols which are also suitable for use in the preparation of the above polycarbonates are disclosed in U.S. Pat. Nos. 2,999,835, 3,038,365, 3,334,154, and 4,131,575, incorporated by reference.

As used herein, aliphatic-aromatic polyesters have the formula:

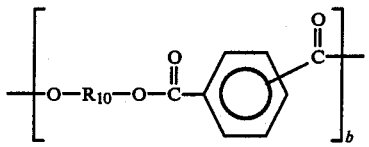

where b represents a whole number in excess of 1, e.g., 10 to 10,000 or more, $R_{10}$ is a divalent alkylene or cycloalkylene radical containing from 1 to 20 or more carbon atoms, preferably 1 to 10 carbon atoms, and preferably the two carbonyl groups are located on the aromatic ring in a para- or meta-position relative to each other. Preferably, $R_{10}$ is alkylene of 2 to 4 carbon atoms.

Preferred aliphatic-aromatic polyesters include polyethylene terephthalate and polybutylene terephthalate resins, hereafter sometimes referred to as PET and PBT, respectively. In general, the PET and PBT resins comprise high molecular weight poly(1,4-ethylene terephthalate) resins and poly(1,4-butylene terephthalate) resins having repeating units of the general formulas, respectively:

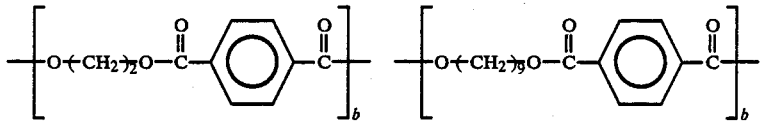

b being as previously defined, and mixtures thereof.

Preferred aliphatic-aromatic polyesters for this invention also include PET copolymers and PBT copolymer, i.e., esters that contain a minor amount e.g., from about 0.5 to about 2% by weight, of repeating units derived from an aliphatic or another aromatic dicarboxylic acid and/or another aliphatic diol or polyol. Among the units which can be present in the copolymers are those derived from aliphatic dicarboxylic acids, e.g., acids having up to about 50 carbon atoms, including cycloaliphatic, straight and branched chain acids, such as adipic acid, cyclohexanediacetic acid, dimerized $C_{16}$ unsaturated acids (which have 32 to 36 carbon atoms), trimerized acids, and the like. Among the units in the copolyesters can also be minor amounts derived from aromatic dicarboxylic acids, e.g., acids having up to about 36 carbon atoms, such as isophthalic acid and the like. In addition to the PET and PBT units derived from ethylene glycol and 1,4-butylene glycol, respectively, there can also be minor amounts of units derived from other aliphatic glycols and polyols, e.g., diols and polyols having up to about 50 carbon atoms, including ethylene glycol, propylene glycol, butylene glycol, cyclohexanediol and the like. A particularly preferred polyester is that which is derived from an alkylenediol, such as ethylene glycol, a cycloalkyldiol such as 1,4-cyclohexanedimethanol, and an aromatic carboxylic acid of up to 20 carbon atoms such as terephthalic acid where the alkylene diol and the cycloalkylene diol are included in the mole ratio of about 1:9 to 9:1.

Another suitable polyester for the blends of the invention is that which is derived from a cycloalkyl diol such as 1,4-cyclohexanedimethanol and one or more aromatic carboxylic acids of up to about 20 carbons. Phthalic acid, isophthalic acid or mixtures thereof are particularly suitable for the aromatic carboxylic acid component of these polyesters.

The polyetherimides can be obtained by any of the methods well known to those skilled in the art including the reaction of any aromatic bis(ether anhydrides) of the formula

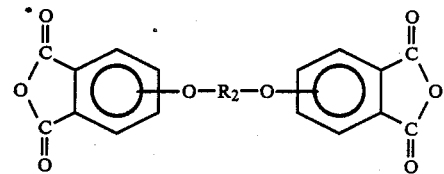

where $R_2$ is as defined hereinbefore with an organic diamine of the formula $$H_2N-R_3-NH_2$$

where $R_3$ is as defined hereinbefore.

Aromatic bis(ether anhydride)s of the above formula include, for example, 2,2-bis[4-(2,3-dicarboxyphenoxy)phenyl]propane dianhydride; 4,4′-bis(2,3-dicarboxyphenoxy)diphenyl ether dianhydride; 1,3-bis(2,3-dicarboxyphenoxy)benzene dianhydride; 4,4′-bis(2,3-dicarboxyphenoxy)diphenyl sulfide dianhydride; 1,4-bis(2,3-dicarboxyphenoxy)benzene dianhydride; 4,4′-bis(2,3-dicarboxyphenoxy)benzophenone dianhydride; 4,4′-bis(2,3-dicarboxyphenoxy)diphenyl sulfone dianhydride; etc., 2,2-bis[4-(3,4-dicarboxyphenoxy)phenyl]propane dianhydride; 4,4′-bis(3,4-dicarboxyphenoxy)diphenyl ether dianhydride; 4,4′-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4′-bis(3,4- dicarboxyphenoxy)benzophenone dianhydride; 4-(2,3-dicarboxyphenoxy)-4'(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. No. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4'-bis(β-amino-t-butyl)toluene, bis(p-β-amino-t-butylphenyl)ether, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, and the like, and mixtures of such diamines.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the aforementioned dianhydrides with any of the aforementioned diamino compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. 3,847,867, Heath et al. 3,847,869, Williams 3,850,885, Takekoshi et al. 3,852,242 and 3,855,178 White. These disclosures are incorporated herein in their entirety by reference for the purpose of teaching, by way of illustration, general and specific methods for preparing polyetherimides suitable for the blends of this invention.

The polyetherimides may also be prepared by the reaction of a bis(nitrophthalimide) and an alkali metal salt of an organic compound, a dihydric phenol and an alkali phenoxide, or the reaction of an aryloxy-substituted bisphthalimide, as disclosed in U.S. Pat. Nos. 3,887,588 to Cook et al.; 4,017,511 to Williams and 4,024,110 to Takekoshi, incorporated herein by reference.

The polyarylates used in the blends of the subject invention can be made by a variety of methods. For example, an interfacial polycondensation can be used in which an aqueous alkaline solution (a pH above about 7 to about 13) of a dihydric phenol and an aromatic dicarboxylic acid dihalide mixture dissolved in a water-immiscible organic solvent are mixed and reacted. Typical interfacial polycondensation procedures are disclosed, for example, in W. M. Eareckson, J. Polymer Sci., XL 399 (1959).

According to a typical polycondensation procedure, an aqueous alkaline solution of dihydric phenol is added to the dihalide mixture, dissolved in an organic solvent, or an organic solvent solution of the dihalide mixture is added to an aqueous alkaline solution of diphenol and the system then is polymerized. Alternatively, an aqueous alkaline solution of the dihydric phenol and a water-immiscible organic solvent solution of the dihalide mixture can be simultaneously fed into a reaction vessel. Interfacial polycondensation takes place near the interface of the aqueous phase and the organic phase. However, since the aqueous phase and the organic phase are essentially immiscible, it is necessary to mutually disperse the phases with, for example, an agitator or a mixer such as a homomixer.

The concentration of the dihalide mixture dissolved in the organic solvent is usually about 2 to about 25% by weight, preferably 3 to 15% by weight. The concentration of the dihydric phenol in the aqueous alkaline solution is also usually about 2 to about 25% by weight, preferably 3 to 15% by weight. The amounts of diphenol and the terephthaloyl dihalide mixture are such that the molar ratio between them is preferably maintained equivalent. An excess of the dihalide mixture is generally not desirable in the preparation of high molecular weight (e.g., about $1 \times 10^4$) aromatic copolyesters.

Preferred alkalis are sodium hydroxide and potassium hydroxide. The concentration of the alkali in the aqueous solution can vary considerably depending upon the reaction conditions, but usually ranges from about 0.5 to about 10% by weight. Advantageously, the quantity of the alkali is nearly equivalent to the hydroxy groups of the diphenol used or the alkali is present in a slight excess.

Hydrocarbons or halogenated hydrocarbons can be used as water-immiscible organic solvents for the dihalide mixture. Examples of suitable organic solvents are methylene dichloride, chloroform, tetrachloromethane, 1,2-dichloroethane, 1,1,2-trichloroethane, tetrachloroethane, benzene and methylbenzene. Especially preferred are those solvents which also dissolve the polyarylate produced. Methylene dichloride is the most preferred solvent.

The reaction temperature may vary considerably but it is preferably below about 40° C. Reaction temperatures of 5° to 30° C. are especially preferred.

The interfacial polymerization is usually performed at normal atmospheric pressure, and is completed in about 1 to 30 hours. A catalyst and a viscosity stabilizer are in general employed. Examples of catalysts which can be used include quaternary ammonium compounds, tertiary sulfonium compounds, quaternary phosphonium compounds, quaternary arsonium compounds, and tertiary amine compounds. Suitable viscosity stabilizers are, for example, monohydric phenols such as o-phenyl phenol, p-phenyl phenol, m-cresol, p-tert-butyl phenol, 2-phenyl-2-hydroxy-phenylpropane and -naphthol. The amount of catalyst used ranges from about 0.01 to about 1 mol % based on the diphenol and the amount of viscosity stabilizer ranges from about 0.5 to about 5 mol % based on the diphenol.

Another useful method for forming polyarylates is by melt polymerization as disclosed, for example, in A. Conix, Ind. Eng. Chem., 51, 147 (1959), Japanese Patent Publication No. 15247/1963 and U.S. Pat. No. 3,395,119.

Melt polymerization can be performed, for example, by reacting an aliphatic carboxylic acid diester of the dihydric phenol, e.g., as described above, with the aromatic polycarboxylic acid at an elevated temperature under reduced pressure. Melt polymerization can also be carried out by reacting the diphenol and a mixture of a diaryl ester of the acid while heating. A typical diaryl ester is the diphenyl ester. The reaction temperature employed is in the range of about 150° to about 350° C., preferably 180° to 320° C. The reaction pressure is usually varied in the course of the reaction from atmospheric pressure at the early stage of the reaction to reduced pressure, for example, below about 0.02 mmHg, toward the end of the reaction. The melt polymerization is completed, in general, in about 2 to about 8 hours.

A number of catalysts can be used in the reaction and preferred catalysts include titanium compounds such as butyl ortho-titanate and titanium dioxide. Other catalysts such as zinc oxide, lead oxide and diantimony trioxide can also be used.

Still another method for forming polyarylates is solution polymerization in which the polyarylate is prepared by reacting the diphenol with an aromatic dicarboxylic acid dihalide and in a water-immiscible organic solvent. Useful solution polymerization procedures are disclosed, for example, in A. Conix, Ind. Eng. Chem., 51, 147 (1959), and U.S. Pat. No. 3,133,898.

In solution polymerization, the dihydric phenol and the acid dihalide are usually mixed in equimolar proportions in a water-immiscible organic solvent, and the mixture is gradually heated to high temperatures of, for example, about 220° C. Preferably, the solvent used is one which also dissolves the polyarylate formed, such as dichloroethylbenzene. Usually, the reaction is carried out in the presence of a base to neutralize the hydrogen halide, for example, hydrogen chloride, formed. Suitable examples of the bases which can be used include a tertiary amine such as trimethylamine, triethylamine, etc., and pyridine.

The polycarbonates of the subject blends can be manufactured by known processes, such as, for example, by reacting a dihydric phenol with a carbonate precursor such as diphenyl carbonate or phosgene (carbonyl chloride) in accordance with methods set forth in the above cited literature and U.S. Pat Nos. 4,018,750 and 4,123,436, or by transesterification processes such as are disclosed in U.S. Pat. No. 3,153,008, as well as other processes known to those skilled in the art. The polycarbonates utilized in the present invention also include the polymeric derivatives of a dihydric phenol, a dicarboxylic acid, and carbonic acid such as are disclosed in U.S. Pat. No. 3,169,131.

It is also possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic polycarbonate utilized in the practice of this invention. Also employed in the practice of the invention can be blends of any of the above materials to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The aliphatic-aromatic polyesters of the above formula can be obtained by any of the methods well-known to those skilled in the art including the reaction of any derivatives of an aromatic dicarboxylic acid of the formula

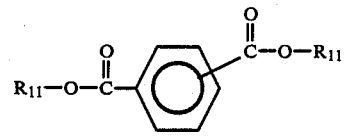

where independently each $R_{11}$ is an alkyl radical having from 1–10 or more carbon atoms, with any aliphatic diol of the formula $$HO-R_{10}-OH$$

where $R_{10}$ is as previously defined.

As used herein and in the appended claims, the term polyesters include esters of the above formula prepared by esterifying or transesterifying terephthalic acid, isophthalic acid, or their low molecular weight esters, or mixtures thereof, plus other polyesters derived from aromatic dicarboxylic acids or their alkyl esters and other aliphatic diols or polyols other than those set forth above, subject to the proviso that the polyesters contain at least about 95% by weight polyesters derived from the esterification or transesterification of dicarboxylic acid or esters and aliphatic diols of the above formulae.

Among the many methods of making aliphatic-aromatic polyesters which are hereby incorporated herein by reference in their entirety, are those disclosed in the Encyclopedia of Polymer Science and Technology, Vol. II, entitled "Polyesters", pages 62–128, published by Interscience Publishers (1969), as well as those disclosed in Wirth et al. U.S. Pat. Nos. 3,787,364 and 3,838,097, and Winfield et al. U.S. Pat. No. 2,465,319, Pengilly, U.S. Pat. No. 3,047,539, and the like.

Illustratively, the esterification reactions advantageously can be carried out in an inert atmosphere in the presence of known esterification or transesterification catalysts at nominal reaction temperatures with the simultaneous removal of water or alkanol as produced at elevated temperatures with subsequent further polycondensation at elevated temperatures under reduced pressure in the presence of known catalysts until polyesters of the desired viscosity are obtained.

In accordance with the present invention, blends of a polyetherimide, a polyarylate, and a thermoplastic polymer selected from polycarbonates and aliphatic-aromatic polyesters are generally obtainable in all proportions of the three polymers relative to each other. Thus, the polyetherimide and polyarylate components of the blend may be mixed in weight ratios of 1:99 to 99:1 relative to each other and such a range of mixtures may be combined with the thermoplastic component in weight ratios of 1:99 to 99:1. It may be generally desirable to include a minimum amount of, for example, about 5%, of each of the components to achieve the desired properties, for the blend. Consequently, blends comprising from about 5 to 85%, by weight, polyetherimide, from about 5 to about 85%, by weight, polyarylate, and the remainder the above-mentioned thermoplastic polymer are preferred blends of the invention. By controlling the proportions of the components of the blend relative to each other, blends having certain predetermined useful properties which are improved over those of certain components alone may be readily obtained. In general, blends of the subject invention may exhibit, depending on the blend ratio of the components, one or more of the properties of high flame resistance, good impact strength and high heat distortion temperature.

It is contemplated tha the blends of the present invention may also include other additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more polyarylates or two or more polyarylates in combination with one or more polyetherimides.

Methods for forming blends of the present invention may vary considerably. Prior art blending techniques are generally satisfactory. A preferred method comprises blending the polymers and additives such as reinforcements in powder, granular and filamentous form, extruding the blend, and chopping the extrudate into pellets suitable for molding by means conventionally used to mold normally solid thermoplastic compositions.

The subject ternary blends have application in a wide variety of physical shapes and forms, including the use as films, molding compounds, coatings, etc. When used as films or when made into molded products, these blends, including laminated products prepared therefrom, not only possess good physical properties at room temperature but they retain their strenghh and excellent response to workloading at elevated temperatures for long periods of time. Film formed from the blends of this invention may be.used in application where films have been used previously. Thus, the blends of the present invention can be used in automobile and aviation application for decorative and protective purposes, and as high temperature electrical insulation for motor slot liners, transformers, dielectric capacitors, coil and cable wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject ternary blends can also serve in printed circuit applications.

Alternatively, solutions of the blends herein described can be coated on electrical conductors such as copper, aluminum, etc. and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymer blends of the invention by incorporating such fillers as asbestos, glass fibers, talc, quartz, powder, finely divided carbon, silica, into the blends prior to molding. Shaped articles may be formed under heat, or under heat and pressure, in accordance with practices well-known in the art.

The following examples illustrate specific ternary blends in accordance with the present invention. It should be understood that the examples are given for the purpose of illustration and do not limit the invention. In the examples, all parts and percentages are by weight unless otherwise specified.

EXAMPLE I

A polyetherimide-polyarylate-polycarbonate blend according to the invention was prepared, the blend then molded into test bars and the bars tested for various physical and chemical properties.

The polyetherimide for the blend was prepared from the reaction product of essentially equimolar amount of 2,2-bis[4-(3,4-dicarboxyphenoxy)phenyl] propane dianhydride and m-phenylene diamine produced at elevated temperature of about 250° to about 300° C. and under a nitrogen atmosphere. The polymer was extruded at about 300° C. to form a strand and mechanically chopped into pellets. A test bar injection molded from the pellets was clear and had a heat distortion temperature of about 390° F. at about 264 psi and a notched Izod impact strength (ASTM 256) of about 1.0 ft-lb/in. To mold the test bar at a temperature of about 685°–700° F., a pressure in excess of 2000 psi was necessary.

The polyarylate was produced from the reaction of bisphenol A and a mixture of terephthalic acid chloride and isophthalic acid chloride and sold commercially under the trade name ARDEL D-100 by Union Carbide Corporation. This polyarylate by itself was clear and had a heat distortion temperature of about 342° F. at about 264 psi, a flexural strength of about 14,000 psi, a flexural modulus of about 282,000 psi and a notched Izod impact strength of about 5.2 ft-lbs/in. The pressure required to mold a test bar at a temperature of about 685°–700° F. was about 1700 psi.

The polycarbonate used in the blend was a bisphenol A type polycarbonate sold under the trade name LEXAN 121 by General Electric Company, Pittsfield, Mass.

The three polymers were mixed in a weight ratio of about 33.3 parts polyetherimide, about 33.3 parts polyarylate and about 33.3 parts polycarbonate and extruded in a Werner & Pfleiderer extruder having a temperature profile varying from about 615° to 650° F. The resulting extrudate was comminuted into pellets and the pellets injection molded at about 660° F. to 670° F. into test specimens, the latter dimension being the specimen thickness. Impact strength of the specimen was measured according to the the notched Izod test, ASTM D-256, and the results are set forth in Table I. The heat distortion temperature, flexural strength and flexural modulus, and pressure necessary for molding of the blend were also measured and are given in Table I. The flame resistance characteristics of the blend are set forth II as determined by the tests of the type set forth in Bulletin no. 94 of the Underwriters Laboratory.

EXAMPLE II

The procedure of example I was repeated with the exception that about 12.5 parts of polyetherimide, about 12.5 parts of polyarylate and about 75 parts of polycarbonate, all by weight, were formulated, to produce the blend according to the invention and the blend was injection molded at about 685° to 700° F. to produce test bars. The results of the notched Izod impact test, as well as the appearance, heat distortion temperature, flexural strength, flexural modulus and molding pressure for the blend are detailed in Table I. The flame resistance characteristics of the blend are set forth in Table II.

EXAMPLE III

The procedure of Example I was repeated with the exception that about 12.5 parts of polyetherimide, about 75 parts of polyarylate and about 12.5 parts of polycarbonate, all by weight, were formulated, to produce the blend according to the invention and the blend was injection molded at about 685° to b 700° F. to produce test bars. The results of the notched Izod impact test, as well as the appearance, heat distortion temperature, flexural strength, flexural modulus and molding pressure for the blend are detailed in Table I. The flame resistance characteristics of the blend are set forth in Table II.

EXAMPLE IV

The procedure of Example I was repeated with the exception that about 75 parts of polyetherimide, about 12.5 parts of polyarylate and about 12.5 parts of polycarbonate, all by weight, were formulated, to produce the blend according to the invention and the blend was injection molded at about 685° to 700° F. to produce test bars. The results of the notched Izod impact test, as well as the appearance, heat distortion temperature, flexural strength, flexural modulus and molding pressure for the blend are detailed in Table I. The flame resistance characteristics of the blend are set forth in Table II.

TABLE II

| | Flame Resistance | | | |
| | Seconds to Quench (Two Specimens) | | | |
| Example | 1st Ign. | 2nd Ign. | 3rd Ign. | Comment |
| --- | --- | --- | --- | --- |
| I | 0,0 | 1,3 | 0,1 | ND* |
| II | 0,0 | 2,1 | 1,1 | ND |
| III | 0,0 | 0,0 | 2,2 | ND |
| IV | 0,0 | 1,0 | 2,4 | ND |

*ND = No Drip

EXAMPLE V

The procedure of Example IV was repeated with the exception that an aliphatic polyester was substituted for the polycarbonates. The polyester used was a polyethylene terephthalate sold under the trade name Goodyear VFR 3599. The blend was formulated using about 75 parts by weight of polyetherimide, about 12.5 parts by weight polyarylate and about 12.5 parts by weight polyethylene terephthalate. The blend was extruded at about 680° F. and molded at 650°-700° F. Test specimens were measured for Izod impact strength, heat distortion temperature, flexural strength and flexural modulus. The results are set forth in Table III. The flame resistance characteristics are detailed in Table IV.

EXAMPLE VI

The procedure of Example V was repeated with the exception that about 12.5 parts of polyetherimide were blended with about 12.5 parts of polyarylate and 75 parts polyethylene terephthalate to produce the blend according to the invention. The results of the notched Izod impact test, as well as the heat distortion temperature, flexural strength and flexural modulus for the blend are detailed in Table III. The results of flame resistance tests for the blend are set forth in Table IV.

EXAMPLE VII

The procedure of Example V was repeated with the exception that about 12.5 parts of polyetherimide were blended with about 75 parts of polyarylate and 12.5 parts polyethylene terephthalate to produce the blend according to the invention. The results of the notched Izod impact test, as well as the heat distortion temperature, flexural strength and flexural modulus for the blend are detailed in Table III. The results of the flame resistance tests for the blend are set forth in Table IV.

EXAMPLE VIII

The procedure of Example V was repeated with the exception that about 33.3 parts of polyetherimide were blended with about 33.3 parts of polyarylate and 33.3 parts polyethyleneterephthalate to produce the blend according to the invention. The results of the notched Izod impact test, as well as the heat distortion temperature, flexural strength and flexural modulus for the

TABLE I

| Example | Notched Izod (ft-lb/in) | Heat Distortion Temperature (°F. at 264 psi) | Flexural Strength (psi) | Flexural Modulus (psi) | Molding Pressure (psi) | Appearance |
| --- | --- | --- | --- | --- | --- | --- |
| I | 1.4 | 311 | 12,500 | 340,000 | — | — |
| II | 10.6 | 288 | — | — | 1,000 | pearlescent |
| III | 5.5 | 340 | — | — | 1,200 | pearlescent |
| IV | 1.2 | 364 | — | — | 1,700 | pearlescent | blend are detailed in Table III. The results of flame resistance tests for the blend are set forth in Table IV.

TABLE III

| Example | Notched Izod (Ft-lb/in) | Heat Distortion Temperature (°F. at 264 psi) | Flexural Strength (psi) | Flexural Modulus (psi) |
| --- | --- | --- | --- | --- |
| V | 1.0 | 319 | 9,200 | 220,000 |
| VI | 0.9 | 238 | 8,600 | 182,000 |
| VII | 1.0 | 300 | 8,300 | 192,000 |
| VIII | 0.9 | 242 | 8,280 | 185,000 |

TABLE IV

| Example | Seconds to Quench | | | Comment |
| --- | --- | --- | --- | --- |
| | 1st Ign. | 2nd Ing. | 3rd Ign. | |
| V | 0,0 | 2,1 | 30, 30 | ND* |
| VI | 0,0 | 30, 30 | burns | ND |
| VII | 0,0 | 1,2 | 2,2 | ND |
| VIII | 0,0 | 0,0 | 30, 30 | ND |

*ND = No Drip

As is apparent from the above results, blends according to the invention generally exhibit good flame resistance and heat distortion characteristics, particularly when a relatively high proportion of polyetherimide is used in the blend. In addition, by appropriate selection of components ratios, blends can be formulated which have combinations of desirable properties such as high impact strength and flame resistance, e.g., the blends of Examples II and III, or high heat distortion and high flame resistance, e.g., the blend of Example IV.

Substitution of other polyetherimides, polyarylates and/or thermoplastic polymers for the components of the blends of the above examples may result in the formulation of polymer blends having improved characteristics such as imapct strength, flame resistance and high heat distortion temperature over the polymer components above.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of (a) a polyarylate which is derived from at least one dihdyric phenol and at least one aromatic dicarboxylic acid, (b) a polyetherimide and (c) a thermoplastic polymer which is compatible with the blend of the polyarylate and the polyetherimide.

2. A composition as defined in claim 1 wherein the dihydric phenol is of the formula:

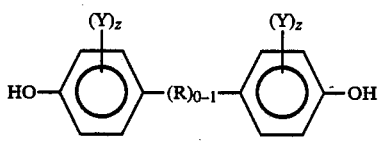

wherein Y is independently selected from alkyl groups of 1 to 4 carbon atoms, cycloalkyl groups of 6 to 12 carbon atoms, aryl groups of 6 to 12 carbon atoms, aryl group sof 6 to 20 carbon atoms chlorine or bromine, z independently has a value from 0 to 4, inclusive, and R is a divalent saturated aliphatic or aromatic hydrocarbon radical selected from alkylene and alkylidene radicals having from 1 to 8 carbon atoms, cycloalkylene and cycloalkylidene radicals having up to and including 9 carbon atoms and arylene radicals having from 6 to 20 carbon atoms.

3. A composition as defined in claim 2 wherein each z is 0 and R is an alkylidene radical of 3 carbon atoms.

4. A composition as in claim 1 wherein the aromatic dicarboxylic acid in (a) is selected from terephthalic or isophthalic acids, or mixtures thereof.

5. A composition as defined in claim 1 wherein the polyetherimide is of the following formula:

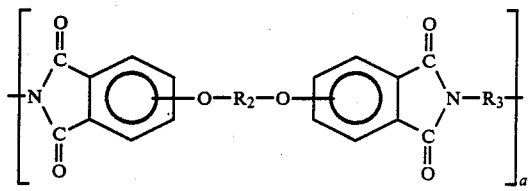

wherein a is an integer greater than 1, preferably from about 10 to 10,000 or more, —O—R₂—O— is attached to the 3 or 4 and 3' or 4' positions and R₂ is selected from (a) a substituted or unsubstituted aromatic radical such as

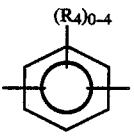

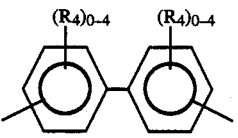

(b) a divalent radical of the formula:

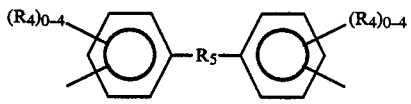

wherein R₄ is independently C₁ to C₆ alkyl, or halogen and R₅ is selected from —O—, —S —,

—SO₂—, —SO—, alkylene of 1 to 6 carbon atoms, cycloalkylene of 4 to 8 carbon atoms and alkylidene of 1 to 6 carbon atoms or cycloalkylidene of 4 to 8 carbon atoms; R₃ is selected from an aromatic hydrocarbon radical having from 6 to 20 carbon atoms and halogenated derivatives thereof or alkyl substituted derivatives thereof wherein the alkyl group contains 1 to 6 carbon atoms, alkylene and cycloalkylene radicals having from 2 to 20 carbon atoms, C₂—C₈ alkylene terminated polydiorganosiloxane and a divalent radical of the formula

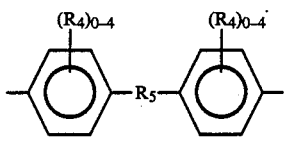

wherein R₄ and R₅ are as previously defined and wherein R₅ may be a direct bond.

6. A composition as defined in claim 1 wherein the polyetherimide is of the following formula:

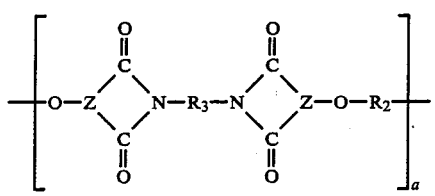

wherein

is a member selected from

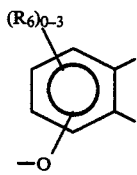

wherein R₆ is independently hydrogen, lower alkyl or lower alkoxy

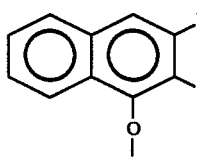 and

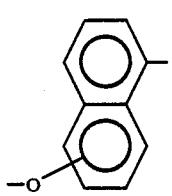

wherein the oxygen may be attached to either ring and located ortho or para to one of the bonds to the anhydride carbonyl group, a is an integer greater than 1, preferably from about 10 to about 10,000 or more, R₂ is selected from (a) a substituted aromatic radical such as

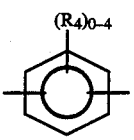

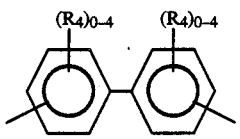

(b) a divalent radical of the formula

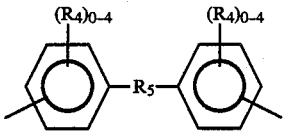

wherein R₄ is independently C₁ to C₆ alkyl, or halogen and R₅ is selected from —O—, —S—,

—SO₂—, —SO—, alkylene of 1 to 6 carbon atoms, cycloalkylene of 4 to 8 carbon atoms and alkylidene of 1 to 6 carbon atoms or cycloalkylidene of 4 to 8 carbon atoms; R₃ is selected from an aromatic hydrocarbon radical having from 6 to 20 carbon atoms and halogenated derivatives thereof or alkyl substituted derivatives thereof wherein the alkyl group contains 1 to 6 carbon atoms, alkylene and cycloalkylene radicals having from 2 to 20 carbon atoms, C₂-C₈ alkylene terminated to 20 carbon atoms polydiorganosiloxane and a divalent radical of the formula

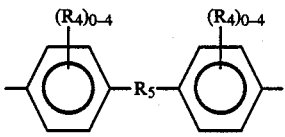

wherein R₄ and R₅ are as previously defined and wherein R₅ may be a direct bond.

7. A composition as in claims 1, 5, or 6 wherein the polyetherimide is of the following formula:

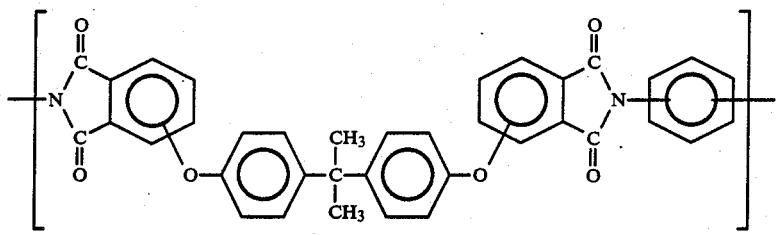

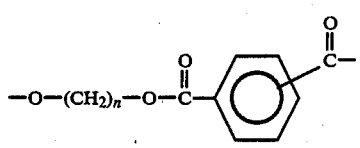

8. A composition as in claim 1 wherein the thermoplastic polymer is at least one of a polyester or a polycarbonate.

9. A composition as defined in claim 8 wherein the polyester is derived from an aliphatic diol and an aromatic dicarboxylic acid having repeating units of the following general formula:

10. A composition as defined in claim 8 or 9 wherein the polyester is poly(ethylene terephthalate).

11. A composition as defined in claim 8 wherein the polycarbonate is the reaction product of a dihydric phenol and a carbonate precursor.

12. A composition as defined in claims 8 or wherein the dihydric phenol is bisphenol-A and the carbonate precursor is carbonyl chloride.

13. A composition in accordance with claims 8 or 11 wherein the dihydric phenol is bisphenol-A and the carbonate precursor is diphenyl carbonate.

14. A composition in accordance with claim 1 further containing at least one filler.

* * * * *